United States Patent Office 3,409,565
Patented Nov. 5, 1968

3,409,565
OLEFIN OXIDE AND OLEFIN SULFIDE
POLYMERIZATION
Joginder Lal, Akron, Ohio, assignor to Goodyear Tire &
Rubber Company, Akron, Ohio, a corporation of Ohio
No Drawing. Continuation-in-part of application Ser. No.
397,624, Sept. 18, 1964. This application May 15, 1967,
Ser. No. 638,598
10 Claims. (Cl. 260—2)

ABSTRACT OF THE DISCLOSURE

Novel catalysts for polymerizing olefin oxides and olefin sulfides to high molecular weight polymers are obtained by reacting zinc or cadmium alkyl xanthates with a wide variety of alcohols. Mercaptans or phenols can be substituted for alcohols in preparing these catalysts. These catalysts have the unusual characteristics of possessing metal-sulfur-metal bonds detectable as ionic sulfur.

Polymers of olefin oxides obtained with these catalysts contain significant amounts of acetone-insoluble fraction (which is an approximate measure of the stereoregularity). Gum vulcanizates exhibiting high tensile strength can be obtained from copolymers of propylene oxide and allyl glycidyl ether. These elastomers are useful for a variety of rubber goods such as hose and belting.

---

This application is a continuation-in-part of my application Ser. No. 397,624, filed Sept. 18, 1964.

The invention relates to a novel process for the polymerization of olefin oxides and olefin sulfides and to the novel catalyst employed.

A variety of catalysts are known to be capable of polymerizing alkylene oxides to produce polymers. Examples of such known catalysts are metal halides, metal halide-alkylene oxide complexes, metal alkoxides and carbonates of the alkaline earth metals. More recently, it has been disclosed that metal alkyls in combination with water, alcohols or oxygen form suitable catalysts for polymerizing alkylene oxides. The utilization of organometallic compounds of this nature are not without drawbacks. Metal alkyls, in addition to being expensive, are potentially hazardous, especially when handled in large quantities, because of their toxic fumes and pyrophoric properties.

Accordingly, one object of the present invention is the disclosure of a new catalyst system for polymerizing epoxides and episulfides. Another object is the disclosure of an effective, but relatively inexpensive, catalyst. A further objective is the development of a catalyst system which is relatively safe for industrial use. These and other objects will readily become apparent to those skilled in the art in the light of the teachings herein set forth.

Applicant has now discovered a polymerization process which comprises polymerizing a monomer represented by the formula

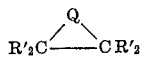

wherein Q represents oxygen or sulfur; R' represents R or hydrogen; R represents a monovalent hydrocarbon, oxyhydrocarbon, or thiohydrocarbon radical in the presence of a catalyst comprising the metal-containing reaction product of (A) an alcohol, phenol, or mercaptan and (B) a compound represented by the formula

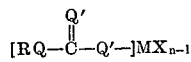

wherein R and Q each have the meaning previously indicated; Q' represents sulfur or oxygen and at least one Q' in each molecule must be sulfur; M represents zinc, cadmium, aluminum or iron; $n$ represents the valence of M; and X represents any monovalent radical selected from the group consisting of halide, hydroxyl, hydride, alkoxy, thioalkyl, hydrocarbon radical and

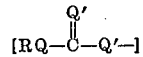

In its broad scope, the subject invention reveals a novel catalyst and method for polymerizing compounds broadly characterized as epoxides and episulfides, and particularly those materials known as oxirane

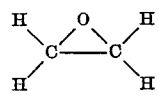

and thiirane

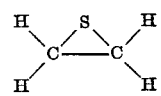

and the mono-, di-, tri-, and tetrasubstituted derivatives thereof, to form polymers. Representative examples of radicals which may be substituents of oxirane and thiirane in the practice of this invention are: alkyl (especially alkyl having up to fourteen carbon atoms), alkenyl, cycloalkyl, aryl, aralkyl, alkoxyalkyl, alkenoxyalkyl, alkoxy and alkenoxy radicals.

Representative examples of derivatives of oxiranes are: propylene oxide, 1-butene oxide, 2-butene oxide (cis or trans), 1-hexene oxide, 1-octene oxide, 2-octene oxide (cis or trans), 1-dodecene oxide, styrene oxide, 3-phenyl-1,2-epoxypropane (benzylethylene oxide), 3,3,3-trifluoro-1,2-epoxypropane, epichlorohydrin, epibromohydrin, epifluorohydrin, butadiene monoxide, isoprene monoxide, 1,2 - epoxy-3-ethoxypropane, 1,2-epoxy-3-hexoxypropane, 1,2-epoxy - 3 - dodecyloxypropane, 1,2-epoxy-2-(β-chloroethoxy)propane, 1,2-epoxy-3-phenoxypropane, 1,2-epoxy-3-(p-chlorophenoxy)propane, 1,2-epoxy - 3 - allyloxypropane (allyl glycidyl ether), 4,5-epoxy-1-hexene, 1-phenyl-1,2-epoxypropane, isobutylene oxide, cyclohexene oxide (cis or trans), cyclododecene oxide, indene oxide, 1-vinyl-3,4-epoxycyclohexane, dicyclopentadiene monoxide, limonene monoxide, 1,2 - diphenylethylene oxide, 2,3-epoxypentane, 1,1,2 - trimethylethylene oxide, 2,4,4 - trimethyl-2,3-epoxypentane, 2,4,4 - trimethyl-1,2-epoxypentane, and 1,1,2,2-tetramethylethylene oxide.

Representative examples of substituted thiirane monomers suitable for use in practicing my invention are: propylene sulfide, 1-butene sulfide, 2-butene sulfide (cis or trans), styrene sulfide, 1,2-epithio-3-chloropropane, butadiene monosulfide, 1-vinyl - 3,4 - epithiocyclohexane, isobutylene sulfide, 1,1,1-trimethylethylene sulfide, 1,1,2,2-tetramethylethylene sulfide, and 3,3,3-trifluoro-1,2-epithiopropane.

Substituted oxiranes and thiiranes containing up to 14 carbon atoms make especially useful polymers and are thus preferred.

The novel catalysts employed in the practice of this invention are the metal-containing reaction products of two components of which component (B) is a compound represented by the general formula

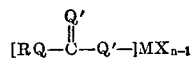

wherein R, Q, Q', M, X and $n$ represent the elements, radicals or valence previously indicated. The other components (A) comprises an alcohol, phenol or mercaptan to be defined in more detail hereinafter.

An essential function group in components (B) of the novel catalyst of this invention is at least one group represented by the monovalent radical $$[RQ-\overset{Q'}{\underset{\|}{C}}-Q'-]$$

bonded to a metal represented by M. The nature of the remaining portion of structure, represented by X supra and satisfying the unused valence(s) of M may be varied. Generally, however, X will consist of monovalent radicals bonded to the metal M, examples of which include halide, hydride, hydroxyl, alkoxy, thioalkyl, hydrocarbon radical, and the radical $$[RQ-\overset{Q'}{\underset{\|}{C}}-Q'-]$$

Within this definition, when at least one X represents the radical $$[RQ-\overset{Q'}{\underset{\|}{C}}-Q'-]$$

the catalyst would then be $$[RQ-\overset{Q'}{\underset{\|}{C}}-Q'-]_2MX_{n-2} \text{ or } [RQ-\overset{Q'}{\underset{\|}{C}}-Q'-]_nM$$

R is the above formula representing component B of the catalyst compounds of this invention may be a hydrocarbon, oxyhydrocarbon or thiohydrocarbon as, for example, an alkyl (including cycloalkyl), aryl, aralkyl, alkaryl, alkenyl, alkoxyalkyl, alkylmercaptoalkyl, aryloxyalkyl or arylmercaptoalkyl radical. The alkyl radicals may be straight chain or branched, long or short, and are particularly useful when they possess up to fourteen carbon atoms.

Thus, component (B) of the catalysts of this invention encompasses compounds in such chemical families as:

I. Tautomeric thiocarbonates:

$$[R-O-\overset{S}{\underset{\|}{C}}-O-]MX_{n-1} \text{ or } [R-O-\overset{O}{\underset{\|}{C}}-S-]MX_{n-1}$$

(also known as Bender's Salt)

II. Tautomeric dithiocarbonates:

$$[R-S-\overset{S}{\underset{\|}{C}}-O-]MX_{n-1}, [R-S-\overset{O}{\underset{\|}{C}}-S-]MX_{n-1}$$

or $$[R-O-\overset{S}{\underset{\|}{C}}-S-]MX_{n-1}$$

(commonly known as xanthate)

III. Trithiocarbonate:

$$[R-S-\overset{S}{\underset{\|}{C}}-S-]MX_{n-1}$$

It will be obvious to those skilled in the art that, since R, M and X can each represents a number of radicals as previously defined, in the various formulas shown above these substituent radicals can be substituted in many combinations and thus produce a wide variety of compounds without departing from the spirit of the invention. Similarly, di- or trihydroxy compounds can be used in preparing the above classes of catalysts.

Examples of the various compounds which belong to the above-mentioned families are: zinc O-ethyl thiocarbonate, cadmium O-butyl thiocarbonate, zinc S-butyl dithiocarbonate, cadmium S-propyl dithiocarbonate, zinc methyl xanthate, zinc ethyl xanthate, zinc isopropyl xanthate, zinc n-butyl xanthate, zinc tetramethylene xanthate, cadmium isopropyl xanthate, cadmium allyl xanthate, ferric isopropyl xanthate, zinc ethyl trithiocarbonate, zinc butyl trithiocarbonate, ethylzinc butyl xanthate, zinc methoxy methyl xanthate, zinc n-butoxy n-butyl xanthate, zinc allyloxy methyl xanthate.

Many of the components (B) employed in practicing this invention and represented by the formula $$[RQ-\overset{Q'}{\underset{\|}{C}}-Q'-]MX_{n-1}$$

may be obtained from commercial sources or prepared by well known methods. (See for instance Organic Chemistry of Bivalent Sulfur, vol. IV, by E. Emmet Reid, Chemical Publishing Co., Inc., New York, 1962.) Those compounds which cannot be secured from commercial sources or prepared by well known methods may be obtained by judicious selection of appropriate reactions. For instance, it is known that diethylzinc and isopropyl alcohol react to form ethylzinc isopropoxide (Harold, Aggarwal, and Neff, Canadian Journal of Chemistry, 41, 1368, 1963).

$$(C_2H_5)Zn + i-C_3H_7OH \rightarrow C_2H_5ZnOC_3H_7(i) + C_2H_6$$

Reaction of ethylzinc isopropoxide (compound A) with an equimolar amount of carbon disulfide gives predominantly ethylzinc isopropyl xanthate.

$$C_2H_5ZnOC_3H_7(i) + CS_2 \longrightarrow C_2H_5ZnS-\overset{S}{\underset{\|}{C}}-OC_3H_7(i)$$

Compound A         Compound B

Compound B can be further reacted, if desired, with a suitable alcohol under mild conditions to yield alkoxy zinc isopropyl xanthate (compound C)

$$C_2H_5ZnS\overset{S}{\underset{\|}{C}}-OC_3H_7(i) + ROH \rightarrow ROZnS-\overset{O}{\underset{\|}{C}}-OC_3H_7(i) + C_2H_5$$

Compound B         Compound C

The component (A) employed in preparing the novel catalyst of my invention is an alcohol, phenol, or mercaptan.

Any suitable monohydric, dihydric or polyhydric alcohol may be used. The OH groups in these alcohols may be attached to primary, secondary or tertiary carbon atoms. These alcohols may also contain substituents which do not destroy the activity of the catalyst. Some examples of suitable alcohols are: paraffin alcohols such as methyl alcohol, ethyl alcohol, n-propyl alcohol, isopropyl alcohol, n-butyl alcohol, sec-butyl alcohol, isobutyl alcohol, tert-butyl alcohol, 1-pentanol, 2 - methyl - 1-butanol, 3-methyl-1-butanol, neopentyl alcohol, 2-pentanol, 3-pentanol, 3-methyl-2-butanol, 2-methyl-2-butanol, hexyl alcohols, decyl alcohol, dodecyl alcohol, octadecyl alcohol, ethylene glycol, 1,2-propanediol, 1,3 - propanediol, 1,2-butenediol, 2,3-butanediol, 1,3-butanediol, 1,4-butanediol, pinacol, 2-methyl-2,4-pentanediol, glycerol; olefinic and acetylenic unsaturated alcohols such allyl alcohol, crotyl alcohol, 1-butene-4-ol, 1-butene-2-methyl-2-ol, 2-butene-1,4-diol, geraniol, propargyl alcohol, 2-butyne1,3-diol; alicyclic alcohols such as cyclopropyl alcohol, cyclobutyl alcohol, cyclobutyl carbinol, cyclopentyl alcohol, 1,2-cyclopentanediol, cyclohexanol, cyclohexenol, 1,2 - cyclohexanediol, menthol, p-menthenols, cyclooctanol, β-cyclohexylethyl alcohol, borneol, cholestrol; aromatic alcohols such as benzyl alcohol, p-fluoro-α-methylbenzyl alcohol, diphenylcarbinol, β-phenylethyl alcohol, phenylmethylcarbinol, cinnamyl alcohol; heterocyclic alcohols such as furfuryl alcohol, tetrahydrofurfuryl alcohol, 3-hydroxytetrahydrofuran, 2-thenyl alcohol, etc. Other examples of suitable alcohols are: 2-dimethylaminoethanol, 2-diethylamino-2-propanol, 3-dimethylamino-1-propanol, 2-dimethylamino-2-methyl-1-propanol, and N-hydroxyethylpiperazine.

Examples of suitable phenols which may be used are: phenol, cresol (o, m, p), 2-chlorophenol, 2,4-dichlorophenol, 2-dimethylaminophenol, 4-diethylaminophenol, 4-(dimethylaminoethyl) phenol, and resorcinol.

Examples of suitable mercaptans which may be used are: methyl mercaptan (methane thiol,) ethyl mercaptan, n-butyl mercaptan, isobutyl mercaptan, tert-butyl mercaptan, tert-dodecyl mercaptan, hexadecyl mercaptan, 2-methoxyethyl mercaptan, 1,2-ethanedithiol, 1,4-butanedithiol, allyl mercaptan, cyclohexyl mercaptan, methylcyclohexenyl mercaptan, β-cyclohexylethyl mercaptan, benzyl mercaptan, β-phenylethyl mercaptan, furfuryl mercaptan, 2-mercaptobenzothiazole, thiophenol, thiocresol, 4 - chlorothiophenol, and 4 - dimethylaminothiophenol. Analogous compounds of selenium and tellurium can also be used. Some examples are: methyl selenomercaptan ($CH_3SeH$), isopropylselenomercaptan, hexyl selenomercaptan, allyl selenomercaptan, cyclobutyl selenomercaptan, benzyl selenomercaptan, ethyl telluromercaptan ($C_2H_5TeH$), dodecyl telluromercaptan, cycloheptyl telluromercaptan.

Mercaptoalcohols can also be used. Some examples are: β-hydroxyethyl mercaptan, β-hydroxypropylmercaptan, γ-hydroxybutyl mercaptan.

Mixtures of these alcohols, mercaptans, selenomercaptans and telluromercaptans can also be employed but it is preferred to use alcohols, and especially alcohols containing up to 14 carbon atoms.

The catalyst of this invention is preferably preformed by suitably reacting the components (A) and (B). An inert solvent may be employed during this reaction. If the metal-containing reaction product separates out it can be isolated by filtration or by centrifuging it. If no such precipitate forms, the entire reaction mixture may be precipitated in excess precipitating hydrocarbon such as petroleum ether, isooctane, pentane, etc. Alternately, the entire reaction mixture may be evaporated to dryness. The catalyst when employed should be free of unreacted alcohol, phenol, or mercaptan to avoid the formation of low molecular weight polymers. To accomplish this, the catalyst may be washed with a suitable organic solvent such as, for example, isooctane, pentane, benzene or toluene, and subsequently dried under vacuum.

The reaction may be accomplished by direct mixing and heating or by adding the component (B) to heated alcohol, phenol or mercaptan. As stated before, the components may be reacted in the presence of an inert diluent such as benzene or toluene.

The reaction between the two components employed in forming the catalyst of the invention may be carried out at atmospheric, sub-atmospheric or superatmospheric pressure. Atmospheric pressure is most convenient. The appropriate temperature will vary to some degree depending upon the alcohol, phenol, or mercaptan and the other component employed. Generally this will be in the range of about 25° C. to 300° C. and most frequently between about 80° C. and 130° C.

The molar ratio of alcohol, phenol, or mercaptan (component A) to the metal salt (component B) may vary from 0.1 to 100, preferably from 1 to 20.

While the amount of catalyst employed in the practice of this invention is not critical, a sufficient amount must be used to provide the desired catalytic effect. Satisfactory results are obtained by employing from 0.001 to 50 grams of catalyst per liter of monomer and optimum results are achieved when from 0.05 to 10 grams per liter are used.

In polymerizing the monomer, the reaction temperature may be varied over a wide range; for instance, from about −10° C. to about 200° C. It has been found that a temperature of 0° C. to 100° C. is convenient for carrying out polymerizations.

As is well understood with polymerization reactions of this type, the reaction time generally increases with decreasing temperature, although other commonly understood factors also influence the polymerization rate. While the process may be conducted at supra-atmospheric, as well as sub-atmospheric pressures, such as are frequently utilized for polymerization reactions, it is an advantage of the subject invention that the process may be performed with good results either very near to or at atmospheric pressure.

The polymerization should generally be conducted in an inert ambient in accordance with conventional polymerization technique. Suitable for this purpose would be an atmosphere of any known gas, such as nitrogen, argon, helium; or a vacuum.

The polymerization process of this invention may be carried out either in bulk or in an inert solvent or suspending medium. For this purpose any common aromatic, cycloaliphatic, aliphatic hydrocarbon, halogenated hydrocarbon or ether may be used; as for example, benzene, toluene, cyclohexane, heptane, hexane, pentane, chlorobenzene, dichlorobenzene, carbon tetrachloride, diethyl ether, tetrahydrofuran and the like. Nitro compounds such as nitrobenzene can also be employed. Benzene has been found to be generally suitable for this purpose.

The polyepoxides and polyepisulfides produced in the practice of the subject invention are high molecular weight polymers which may be crystalline or amorphous solids, or rubbery materials. In addition to the polymers formed by polymerizing monomers of the general type disclosed, the catalyst of the subject invention may be used to form saturated copolymers thereof as well as unsaturated, vulcanizable copolymers. Examples of the saturated copolymers would be the copolymers of ethylene oxide and propylene oxide or ethylene sulfide and propylene sulfide. A vulcanizable copolymer would result, for example, from polymerizing allyl glycidyl ether and propylene oxide monomers; or vinyl cyclohexene oxide and 1-butene oxide monomers; or cyclooctadiene monoxide and propylene oxide monomers; or by dicyclopentadiene monoxide and propylene oxide monomers. As is well understood in the art, the unsaturated monomer is employed in minor amounts up to about 20 parts per hundred parts of the total monomer, and the saturated monomer is employed in major amounts of more than 80 parts per hundred parts of the total monomer. Other examples of the sulfide copolymers would result from the copolymerization of butadiene monosulfide and propylene sulfide. An example of a halo-substituted copolymer is that formed by the copolymerization of epichlorohydrin and propylene oxide. More complicated interpolymers are also envisioned as falling under the scope of this invention. For example, to control crystallinity, to improve vulcanizability or otherwise modify and improve the polymers made by this process it may be beneficial to use one or more than one saturated epoxide monomer in conjunction with one or more unsaturated epoxide monomers; e.g. the product obtained by copolymerizing ethylene oxide, propylene oxide and allyl glycidyl ether monomers; or propylene oxide, styrene oxide and allyl glycidyl ether monomers; or propylene oxide, allyl glycidyl ether and vinyl cyclohexene oxide monomers.

The elastomers produced by my invention may be compounded and processed by normal procedures known in the art. They are readily compounded with fillers such as carbon black and with antioxidants and other conventional compounding materials. The unsaturated elastomers are readily vulcanized with the aid of conventional sulfur plus accelerator vulcanizing systems appropriate for the degree of unsaturation in the elastomer.

EXAMPLES

The practice of this invention is illustrated by reference to the following examples which are intended to be representative rather than restrictive of its scope. As employed in this specification "inherent viscosity" {η} is defined as the natural logarithm of the relative viscosity at 30° C. divided by the polymer concentration for a 0.05 to 0.10 percent (w/v) solution in benzene containing 0.1 percent phenyl β -naphthylamine (PBNA) and expressed in units of dl./g.

Swelling ratio and percent solubility of vulcanizates were determined at 25° C. after immersion for 72 hours in excess toluene containing 0.1 percent PBNA. The solvent was changed after 24 and 48 hours. The swelling ratio is defined as grams of toluene in the swollen vulcanizate per gram of rubber. An average of two values is given.

Acetone solubility of the polymer was determined at 25° C. after suspending 5 grams of polymer for 72 hours in 1-liter of acetone containing a little PBNA. The solvent was changed after 24 and 48 hours.

Ionic sulfur content of the catalyst was determined by decomposing the catalyst with dilute hydrochloric acid, trapping liberated hydrogen sulfide in cadmium chloride solution and titrating cadmium sulfide with potassium iodate.

EXAMPLE 1

One liter of n-butyl alcohol (reagent grade) was placed in a 3-liter flask fitted with a mechanical stirrer, a reflux condenser, an inlet for thermometer, and an inlet tube for nitrogen. The alcohol was heated to 80° C. under a gentle stream of nitrogen. A 40-gram portion of zinc n-butyl xanthate (hereinafter ZBX) which had been crystallized from benzene was added quickly into the flask. The ZBX dissolved rapidly in the alcohol. The molar ratio of n-butyl alcohol to ZBX was 98:1. Stirring was continued and the temperature was maintained at 80° C. After about 20 minutes, a greenish yellow precipitate formed. The reaction was allowed to continue for an additional 40 minutes. Heat was turned off and the reaction mixture allowed to cool slowly. After 16 hours, the mixture was centrifuged. The solid cake was separated from the liquor and treated with 100 ml. dry benzene to remove any unreacted ZBX. After filtration, the residue was dried at 30° C. under 2 torr. for 24 hours to yield 14 grams of a greenish yellow solid which analyzed as follows:

*Analysis.*—C, 13.25%; H, 3.08%; S, 27.05%; Zn, 49.75%. Calculated for ZBX: C, 33.00%; H, 4.99%; S, 35.24%; Zn, 17.97%.

The yellow solid contained 96% ionic sulfur. In contrast, ZBX gave a trace amount of ionic sulfur, presumably due to impurities. The analytical data show that the reaction product of ZBX and n-butyl alcohol is quite different from ZBX itself and is also insoluble in benzene.

EXAMPLE 2

Reaction of ZBX and distilled isobutyl alcohol was carried out exactly in the manner described in Example 1 except that isobutyl alcohol was used in place of n-butyl alcohol. After drying, 13.5 grams of a greenish yellow solid were obtained.

EXAMPLE 3

A 30-gram portion of ZBX was reacted with 1500 ml. of allyl alcohol (distilled over sodium) according to the procedure in Example 1. The reaction mixture was precipitated with excess pentane and filtered. After drying, the residue weighed 8.5 grams. It was extracted with benzene to remove traces of free ZBX, if any.

*Analysis.*—S, 26.85%; Zn, 50.1%.

EXAMPLE 4

A 20-gram portion of ZBX was reacted at 100° C. under nitrogen with 20 ml. of distilled n-butyl alcohol in the presence of 100 ml. dry toluene. The molar ratio of n-butyl alcohol to ZBX was about 4:1. The reaction time was about 1 hour. After cooling, the precipitate was filtered, washed with benzene, and dried to yield 6.2 grams of a solid material.

EXAMPLES 5-15

A 40 ml. portion of propylene oxide, which had been distilled over calcium hydride, was polymerized in 4-oz. bottles under nitrogen in each of the examples No. 5-15 (Table I). Polymerization was carried out with 0.207 g. of catalyst in each case. The bottles were tumbled in a polymerization bath at 50° C. After polymerization, the bottles were cut to remove the solid polymer which was cut into pieces and placed in 200 ml. of methanol containing 0.2 g. PBNA. After standing for 24 hours, the swollen mass was dried first under an aspirator and then under a mechanical pump vacuum.

TABLE I

| Example No. | Catalyst | Polymerization time, hrs. | Conversion to polymer, percent | Inherent viscosity, dl./g. | Percent acetone-insoluble |
|---|---|---|---|---|---|
| 5 | A | 42 | 49 | 4.2 | 34 |
| 6 | B | 42 | 56 | 6.6 | 40 |
| 7 | C | 42 | 43 | 4.2 | 33 |
| 8 | D | 42 | 46 | 4.3 | 34 |
| 9 | E | 120 | 91 | 4.5 | 44 |
| 10 | F | 17 | 70 | 8.0 | 34 |
| 11 | G | 17 | 87 | 9.8 | 45 |
| 12 | H | 21.5 | 47 | 7.0 | 39 |
| 13 | I | 21.5 | 65 | 7.4 | 43 |
| 14 | J | 22 | 95 | 7.8 | 41 |
| 15 | K | 4 | 40 | 4.3 | 29 |

(A) Catalyst prepared in Example 1 from the reaction mixture of ZBX and n-butyl alcohol.

(B) Catalyst prepared in Example 2 by reacting ZBX and isobutyl alcohol.

(C) Catalyst prepared in Example 3 by reacting ZBX and allyl alcohol.

(D) Catalyst prepared by reacting ZBX and excess benzyl alcohol at 80° C. and removing benzyl alcohol under vacuum. Benzene-insoluble fraction used.

(E) Catalyst prepared in Example 4 by reacting ZBX and n-butyl alcohol at 100° C.

(F) Catalyst from Example 1. Used as a 4 percent suspension in a 0.1 solution of poly(propylene oxide) in heptane.

(G) Catalyst prepared at 80° C. by reacting 24.4 g. of ZBX with 610 ml. of n-decyl alcohol for 1 hour, precipitating with excess petroleum ether and extracting the precipitate with benzene.

(H) Catalyst in Example 12 was prepared by reacting at 90° C. for 1 hour 20 grams of ZBX with 150 ml. of tert-butyl alcohol in 150 ml. of toluene. The catalyst was precipitated by adding 800 ml. of isooctane, washed with benzene, and dried under vacuum.

(I) Catalyst in Example 13 was prepared in an analogous manner as catalyst H except that cyclohexanol was substituted for tert-butyl alcohol.

(J) Catalyst in Example 14 was prepared in an analogous manner as catalyst H except that distilled tetrhydrofurfuryl alcohol was substituted for tert-butyl alcohol.

(K) Catalyst in Example 15 was prepared by reacting at 90° C. for 2 hours 20 grams of ZBX with 20 ml. of distilled n-butyl mercaptan in 200 ml. of toluene. The catalyst was precipitated by adding excess isooctane washed with benzene, and dried under vacuum.

EXAMPLES 16-20

Propylene oxide, 1-butene oxide, 1-octene oxide, propylene sulfide, and 1-butene sulfide were polymerized with a catalyst prepared by the reaction of ZBX and n-butyl alcohol at 85-90° C. for 70 minutes according to the general procedure described in Example 1. The polymerization conditions are shown in Table II.

After polymerization, the polymer of propylene oxide was recovered as in Examples 5-15. Polymers from the rest of the monomers were precipitated in excess methanol containing 0.1% PBNA, separated and dried.

TABLE II

| Ex. | Monomer, ml. | Catalyst, g. | Polymerization Temp., °C. | Polymerization Time, hrs. | Conversion to polymer, percent | {η} |
|---|---|---|---|---|---|---|
| 16 | Propylene oxide, 60. | 0.40 | 50 | 9 | [1] 46 | 6.2 |
| 17 | 1-butene oxide, 30. | 0.30 | 10° C. for 48 hrs. followed by 50° C. for 44 hrs. | | 45.6 | 3.6 |
| 18 | 1-octene oxide, 20. | 0.40 | 50 | *2 | [2] 61 | 1.1 |
| 19 | Propylene sulfide, 20. | 0.19 | 10 | 92 | [3] 90.5 | 3.0 |
| 20 | 1-butene sulfide, 20. | 0.19 | 10° C. for 72 hrs. followed by 25° C. for one week. | | 100 | 2.4 |

[1] 43.5% of the polymer was insoluble in acetone.
[2] 83% of the polymer was insoluble in acetone at 50° C. The acetone-insoluble polymer fraction melted at 83.5–85° C. under a polarizing microscope.
[3] 43.8% of the polymer was insoluble in methyl ethyl ketone.
*Weeks.

EXAMPLES 21-25

In Examples 21-25, the reaction between 10 grams of ZBX and different amounts of n-butyl alcohol was carried out in 75 ml. of dry toluene. The reaction mixture was placed in an 8-oz. bottle, flushed with nitrogen, and screw-capped. It was placed in a 90° C. bath for 2 hours. After cooling, the contents were transferred to a beaker and dried under vacuum. The yield of crude product is given in Table No. III. A portion of the crude product was thoroughly washed with pentane (or benzene where indicated) and dried. A 0.30 gram portion of this washed catalyst was used for polymerizing 40 ml. of propylene oxide for 22 hours at 50° C. Ionic sulfur content of the washed catalyst, polymer yield and inherent viscosity are given in Table III.

TABLE III

| Ex. | Catalyst Preparation | | | | | Polymerization | |
|---|---|---|---|---|---|---|---|
| | Catalyst | n-Butyl alcohol, ml. | Molar ratio, alc./ZBX | Yield, g. crude catalyst | Ionic Sulfur, percent | Yield, percent | $[\eta]$ |
| 21 | L | 0.23 | 0.1 | 6.9 | 6.24 | 85 | ---- |
| 22 | M | 0.69 | 0.3 | 6.7 | 7.65 | 93 | 2.8 |
| 23 | N | 1.14 | 0.5 | 4.7 | 12.15 | 76 | 2.9 |
| 24 | O | 2.28 | 1.0 | 4.2 | 19.25 | 99 | 3.6 |
| 25 | P | 4.56 | 2.0 | *2.8 | 20.3 | 99 | 3.9 |

*Washed with benzene.

EXAMPLE 26

Zinc n-butyl xanthate, 2 grams, was dissolved in 100 ml. n-butyl alcohol and the solution kept at 110° C. for 2½ hours. After cooling, the residue was filtered, washed with heptane and dried under 2 mm. torr. to yield 1.2 grams of a greenish yellow powdery material.

A 50 ml. portion of propylene oxide was polymerized at 50° C. for 39 hours with 0.46 gram of the powdery material isolated above. The yield of the polymer was 35.6 grams. It had an inherent viscosity of 6.6.

EXAMPLE 27

Zinc methyl xanthate was reacted with excess warm methanol. The insoluble material formed was filtered for use as a catalyst. The catalyst prepared in this fashion analyzed as follows:

*Analysis.*—S, 30.75%; Zn, 55.35%.

On treatment of the catalyst with dilute HCl, 27.6 percent sulfur was liberated as $H_2S$. This value of ionic sulfur represents about 90 percent of the total sulfur present in the catalyst.

A 40 ml. portion of propylene oxide was polymerized with 0.186 gram of the catalyst at 50° C. for 16.5 hours. The yield of polymer was 55%. Its inherent viscosity was 3.4.

EXAMPLE 28

A 30-gram portion of zinc sec-butyl xanthate was reacted for 1 hour at 100° C. with 750 ml. of isobutyl alcohol according to the general procedure of Example No. 1 to yield 10.5 grams of a benzene-insoluble powder. A dried solution of 17.6 grams of ethylene oxide in 55 ml. benzene was polymerized with 0.207 gram of the catalyst prepared above. The polymerization was carried out at 50° C. for 25 hours to yield 13 grams (74%) of a solid polymer having an inherent viscosity of 2.7.

EXAMPLE 29

A 10-gram portion of ZBX was reacted with 5.17 grams of phenol in the presence of 100 ml. toluene according to the general procedure in Examples No. 21-25. The molar ratio of phenol to ZBX was 2:1. The yield of crude product was 8.5 grams. It was extracted with pentane and dried. The pentane-insoluble product contained 4.3 percent ionic sulfur. A 0.30-gram portion of the pentane-insoluble product was used for polymerizing 40 ml. of propylene oxide for 22 hours at 50° C. The yield of polymer was 29 grams (87%), inherent viscosity 3.4 dl./g. It contained 26% acetone-insoluble fraction.

EXAMPLE 30

A 20-gram portion of ZBX was reacted with 50 ml. of 2-dimethylaminoethanol in the presence of 100 ml. toluene. The reaction was allowed to take place at 90° C. for 2 hours. An orange-color material precipitated out. After cooling, the supernatant liquor was poured off and the precipitate was placed in 600 ml. of benzene and stirred with a magnetic stirrer. The insoluble material was filtered and dried to yield 6.8 grams of an orange-color powder.

*Analysis.*—C, 23.78%; H, 4.36%; N, 3.25%; S, 22.05%; Zn, 42.85%; ionic sulfur, 18.4%.

A 0.10-gram portion of the powdered catalyst was used for polymerizing 40 ml. of propylene oxide at 10° C. for 46 hours. The yield of polymer was 99%, inherent viscosity 9.3. It contained 54 acetone-insoluble fraction.

EXAMPLE 31

A mixture of 240 ml. propylene oxide (3.44 mols) and 15.2 ml. allyl glycidyl ether (0.129 mol) contained in a 1-pint bottle was polymerized under nitrogen with 1.24 grams of the catalyst prepared in Example 1. This catalyst was added to the monomer mixture as a 4 percent dispersion in dried mineral oil. After polymerization for 49 hours at 50° C., the solid copolymer was cut into pieces and immersed for 24 hours in 1 liter of methanol containing 1.5 grams of PBNA. On drying, 225 grams of a tough, rubbery material having an inherent viscosity of 6.3 were obtained. It contained 23 percent acetone-insoluble fraction. The unfractionated copolymer was compounded on a 2-roll mill as follows (all parts expressed by weight):

| | Parts |
|---|---|
| Copolymer | 100 |
| Zinc oxide | 5 |
| Stearic acid | 3 |
| Sulfur | 2 |
| Tuads [1] | 1 |
| Tellax [2] | 0.5 |

[1] Tetramethylthiuram disulfide.
[2] Tellurium diethyldithiocarbamate.

Vulcanization was carried out at 310° F. for 20 minutes. The following stress-strain properties were obtained on the gum vulcanizate sample:

| | |
|---|---|
| Tensile strength, p.s.i. | 2290 |
| Elongation at break, percent | 620 |
| Modulus (100%), p.s.i. | 178 |
| Modulus (300%), p.s.i. | 400 |

On swelling in toluene for 72 hours, a sample of the gum vulcanizate exhibited swelling ratio of 5.0 and 15.2% solubility. The percent solubility is high due to the presence of oil, originally present in the catalyst dispersion.

EXAMPLE 32

A copolymer was prepared by polymerizing at 50° C. a mixture of 250 ml. 1-butene oxide and 12.5 ml. allyl glycidyl ether (molar ratio~96.5:3.6) using 2.2 grams of the powdered catalyst prepared in Example 1. The copolymer was obtained in 84% conversion and had an inherent viscosity of 9.2. This copolymer was compounded and vulcanized as in Example 31 to yield vulcanizates which exhibited the following stress-strain properties:

| | |
|---|---|
| Tensile strength | 1100 |
| Elongation at break, percent | 850 |
| Modulus (100%), p.s.i. | 53 |
| Modulus (300%), p.s.i. | 117 |

EXAMPLE 33

A mixture of 240 ml. of propylene oxide (3.44 mols) and 24.7 grams 1,7-octadiene monoxide (0.12 mol) was polymerized for 65 hours at 50° C. using 1.24 grams of the benzene-insoluble reaction product of ZBX and n-decyl alcohol as described in Example No. 11. The copolymer (yield 93 grams, inherent viscosity 7.0) was isolated, compounded and vulcanized as in Example 31. The following stress-strain properties were observed:

| | |
|---|---|
| Tensile strength, p.s.i. | 1855 |
| Elongation at break, percent | 445 |
| Modulus (100%), p.s.i. | 242 |
| Modulus (300%), p.s.i. | 687 |

On swelling in toluene for 72 hours, a sample of the gum vulcanizate exhibited a swelling ratio of 4.8 and 7.2% solubility.

EXAMPLE 34

The experiment in Example No. 31 was repeated except that the catalyst employed was the one prepared in Example No. 3 and copolymerization was allowed to continue for 117 hours. The yield of copolymer was 76 percent and its inherent viscosity was 3. Compounding and curing was carried out as in Example No. 31. The following stress-strain properties were obtained on gum vulcanizate samples:

| | |
|---|---|
| Tensile strength, p.s.i. | 2780 |
| Elongation at break, percent | 540 |
| Modulus (100%), p.s.i. | 210 |
| Modulus (300%), p.s.i. | 590 |

EXAMPLE 35

A 25-gram portion of cadmium isopropyl xanthate, which had been crystallized from chloroform, was reacted for 3 hours at 80° C. with 625 ml. of distilled isobutyl alcohol according to the general procedure of Example 1. This was followed by heating for 1 hour at about 100° C. The reaction mixture was evaporated to dryness, refluxed with 500 ml. of chloroform and filtered while hot to isolate the catalytically active insoluble reaction product which was a yellow powder. The yield of yellow powder was 7.0 grams.

A 40 ml. portion of propylene oxide was polymerized with 0.40 gram of this catalyst at 50° C. for 42 hours. The yield of polymer was 39%. Its inherent viscosity was 4.4. This polymer contained 30% acetone-insoluble fraction.

EXAMPLE 36

The catalyst prepared in Example No. 30 was used for preparing a terpolymer of propylene oxide, 1-butene oxide and allyl glycidyl ether. A uniform dispersion of the catalyst was prepared by rolling an 8-oz. bottle containing 5.0 grams of the catalyst, 100 ml. dry mineral oil, and 2 dozen dried porcelain balls. A 13.0 ml. portion of this suspension was used for polymerizing a mixture of 302.5 ml. propylene oxide, 43.5 ml. 1-butene oxide, and 21.75 ml. allyl glycidyl ether at 10° C. in a 1-pint bottle. The molar ratio of the three monomers was respectively 86.3:10.0:3.7. The bottle was allowed to tumble end-on-end in the bath. The polymerization was terminated with methanol containing a small amount of PBNA. The yield of the terpolymer was 310 grams, inherent viscosity 3.1.

The terpolymer was mixed with 50 phr. (wt. parts per 100 parts of rubber) HAF carbon black in a Banbury. The black stock was compounded on a 2-roll mill as follows:

| | Parts |
|---|---|
| Black stock | 150 |
| Zinc oxide | 5 |
| Stearic acid | 3 |
| Sulfur | 2 |
| Tuads | 1 |
| Tellax | 0.5 |

Vulcanization was carried out at 310° F. for 20 minutes.

The following properties were obtained on the vulcanizate sample:

| | |
|---|---|
| Tensile strength, p.s.i. | 2570 |
| Elongation at break, percent | 575 |
| Modulus (100%), p.s.i. | 370 |
| Modulus (300%), p.s.i. | 1250 |
| Swelling ratio | 3.1 |
| Percent solubility | 6.8 |

While certain representative embodiments and details have been shown for the purpose of illustrating the invention, it will be apparent to those skilled in this art that various changes and modifications may be made therein without departing from the spirit or scope of the invention.

I claim:
1. The process consisting of:
I. Polymerizing at least one monomer with the formula

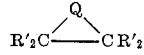

wherein
(A) Q represents oxygen or sulfur;
(B) R' represents R or hydrogen;
(C) R represents a monovalent hydrocarbon, oxyhydrocarbon, or thiohydrocarbon radical containing up to 14 carbon atoms;
II. In the presence of a catalyst consisting of the reaction product of
Component (A), an alcohol, phenol or mercaptan, and
Component (B), a compound represented by the formula

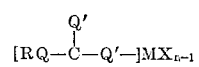

wherein
(1) Q or Q' represents oxygen or sulfur, and at least one Q' must be sulfur,
(2) M represents zinc, cadmium, aluminum, or iron,
(3) X represents any monovalent radical selected from the group consisting of halide, hydroxyl, hydride, alkoxy, thioalkyl, hydrocarbon radical and

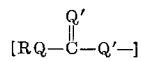

and is joined to the metal atom.
(4) $n$ represents the valence of the metal M, and
(5) R represents a monovalent hydrocarbon, oxyhydrocarbon, or thiohydrocarbon radical containing up to 14 carbon atoms, and
(C) the molar ratio of (A) to (B) is between 0.1:1 and 100:1; and
(D) the polymerization reaction temperature is between about −10° C. and 200° C.

2. The process according to claim 1 wherein X represents

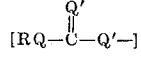

3. The process according to claim 1 wherein the catalyst component II (A) contains an alkyl radical with up to 14 carbon atoms, and R of catalyst component II (B) contains up to 14 carbon atoms.

4. The process according to claim 1 wherein the monomer is a member of the group consisting of 1,2-alkylene oxides and 1,2-alkylene sulfides containing up to 14 carbon atoms per molecule.

5. The process according to claim 1 wherein the monomer consists of at least 80% of saturated olefin oxides or olefin sulfides, and up to 20% of unsaturated olefin oxides or olefin sulfides.

6. The process according to claim 1 wherein the monomer I is propylene oxide, the alcohol II (A) is butyl alcohol and the compound II (B) is zinc n-butyl xanthate or zinc sec-butyl xanthate.

7. The process according to claim 1 wherein the monomer comprises at least 80% propylene oxide and up to 20% allyl glycidyl ether.

8. The process according to claim 1 wherein the monomer I is a 1,2-alkylene oxide containing up to 14 carbon atoms, the catalyst component II (B) is zinc alkyl xanthate and the alkyl radical contains up to 14 carbon atoms, the catalyst component II (A) is an alcohol containing up to 14 carbon atoms, the molar ratio of II (A) to II (B) is at least one.

9. The process according to claim 1 wherein the monomer I is a 1,2-alkylene oxide containing up to 14 carbon atoms, the catalyst component II (B) is zinc n-butyl xanthate and component II (A) is 2-dimethylaminoethanol, and the molar ratio of II (A) to II (B) is at least one.

10. The process according to claim 1 wherein the monomer I consists of at least 80% saturated 1,2-alkylene oxide and up to 20% unsaturated 1,2-alkylene oxide, the catalyst is formed from zinc n-butyl xanthate and 2-dimethylaminoethanol, and the molar ratio of alcohol to xanthate is at least one.

References Cited
UNITED STATES PATENTS

| | | | |
|---|---|---|---|
| 2,718,536 | 9/1955 | Jones | 260—793 |
| 3,026,305 | 3/1962 | Robinson | 260—21 |

WILLIAM H. SHORT, *Primary Examiner.*

T. PERTILLA, *Assistant Examiner.*